United States Patent
Kienel

[15] 3,645,779
[45] Feb. 29, 1972

[54] METHOD OF COATING A TRANSPARENT SYNTHETIC POLYMER SUBSTRATE WITH BORON OXIDE-SILICON DIOXIDE GLASS

[72] Inventor: Gerhard Kienel, Hanau, Main, Germany

[73] Assignee: Leybold-Heraeurs-Verwaltung GmbH, Koln-Bayental, Germany

[22] Filed: July 11, 1969

[21] Appl. No.: 841,124

[30] Foreign Application Priority Data

July 11, 1968 Germany.....................P 17 71 793.0

[52] U.S. Cl. .............................117/106 R, 106/52, 117/119, 117/138.8 F, 117/138.8 UA, 117/138.8 R, 117/169 A, 351/166
[51] Int. Cl........................................B32b 27/06, B44c 1/22
[58] Field of Search....................117/106 R, 169 A, 138.8 F, 117/138.8 UA, 138.8 R, 119

[56] References Cited

UNITED STATES PATENTS 3,250,631    5/1966    Lusher....................................117/125

FOREIGN PATENTS OR APPLICATIONS 502,978    3/1939    Great Britain......................117/106 R
705,253    3/1954    Great Britain......................117/106 R

OTHER PUBLICATIONS

Morey, The Properties of Glass, Reinhold, 1954 pp. 235, 283–285.
Kingery, Introduction to Ceramics, Wiley & Sons, N.Y. 1967 pp. 484–486.

*Primary Examiner*—William D. Martin
*Assistant Examiner*—Ralph Husack
*Attorney*—Spencer & Kaye

[57] ABSTRACT

A synthetic polymer substrate is provided with a hard, abrasion-resistant surface free of fine hairline cracks by vapor depositing under vacuum for degassing, onto the surface a $B_2O_3$-$SiO_2$ glass containing less than 5 percent by weight of $Na_2O$. The deposited glass coating has a temperature coefficient of expansion which more nearly corresponds to that of the substrate than does $SiO_2$.

12 Claims, No Drawings

METHOD OF COATING A TRANSPARENT SYNTHETIC POLYMER SUBSTRATE WITH GLASS BORON OXIDE-SILICON DIOXIDE

BACKGROUND OF THE INVENTION

In the optical industry synthetic thermoplastic polymers are employed to a large extent for eyeglasses and lenses. Such components can be manufactured without bubbles and inexpensively by casting or extrusion molding. By such processes it is possible to obtain complicated surface configurations directly without expensive grinding.

The synthetics employed, however, are generally substantially softer than glass. Products extrusion molded from thermoplastic synthetics have such a low hardness that it is necessary to increase their abrasion resistance by applying thereto a hard, transparent protective layer which does not increase reflection.

Since thermoplastic polymers exhibit a substantially different coefficient of expansion than vapor-deposited protective layers thereon, inorganic protective layers of considerable thickness (between approximately 2 and $10\mu$) tear in response to temperature fluctuations which occur during further processing at temperatures which are preferably below 100° C. Other adverse effects are also encountered, for example, in layer properties, which are partially visually discernible.

To solve this problem, German Pat. No. 1,204,048 discloses a method of producing a protective layer wherein an adhesive layer of $Al_2O_3$ is vapor deposited to a layer thickness of 0.01 to $0.1\mu$ and then a protective layer of $SiO_2$ to a layer thickness of 0.5 to $5\mu$ by means of electron bombardment, the electrons being produced in a chamber which is in communication with the vapor-deposition chamber only through a small opening. The production of such a protective layer meets with difficulties in practice, and the present invention provides a simpler solution of the same problem with better results.

SUMMARY OF THE INVENTION

Nonabrasive, transparent, oxide protective layers resistant to temperature fluctuations are provided on thermoplastic synthetic substrates by vapor deposition. Essential components for the preparation of the oxide protective layers are boron oxide ($B_2O_3$) and silicon dioxide ($SiO_2$). The substrates are primarily those having optical properties and being useful as, e.g., eyeglasses or other types of lenses.

It is an object of the invention to provide thermoplastics with a hard, abrasion-resistant surface. A further object is to retain the optical properties of such thermoplastics. Another object is to deposit a layer of protective material on synthetic thermoplastics. A still further object is to obtain a composite coated thermoplastic with integrity which is not adversely affected by temperature changes that are likely to be encountered thereby. It is also an object to obtain such a composite that no faults or hairline defects are produced therein by changes in temperature. Additional objects will be apparent from the description which follows.

DETAILED DESCRIPTION OF THE INVENTION

A glass is vapor deposited onto a synthetic substrate. Essential components of the glass are boron oxide and silicon dioxide. It is also essential that said glass be produced from components having a grain size of less than 50 microns ($\mu$), e.g., from 5 to 30 z, in diameter and that said components be melted in a vacuum. The coefficient of expansion of the glass, which is to provide a protective layer is adapted to that of the synthetic substrate (thermoplastic polymer) by altering the proportion of boron oxide in said glass. For example the coefficient of 100 percent boron oxide is $150\times10^{-7}$ per °C., that of 100 percent silicon dioxide $5\times10^{-7}$ per °C. A mixture of 50 percent of both components has a coefficient of expansion of $53\times10^{-7}$ per °C. The dependency of the coefficient from the boron oxide proportion in a mixture with silicon dioxide may be represented by a slightly bent curve between the values of pure boron oxide and silicon dioxide. Increasing the proportion of boron oxide also increases the temperature resistance of the resulting glass protective layer (coating). The sodium monoxide ($Na_2O$) components in the vapor-deposited glass are maintained below five percent by weight.

Useful ranges of the proportion of boron oxide are between 10 and 70 percent, preferably between 30 and 50 percent. A proportion of boron oxide smaller than 10 percent is not of interest because of the mechanical properties, a proportion of more than 70 percent is not useful because of the optical properties. There may be other components in the glass, as for instance $Al_2O_3$, $K_2O$ and some impurities; they are, however, not critical as long as the $Na_2O$ and the $K_2O$ proportions are below five percent each, preferably below 2 percent.

The vapor deposition is preferably effected under a high vacuum, i.e., less than $5\times10^{-4}$ torr, e.g., from $2\times10^{-4}$ to $10^{-5}$ torr. The vapor stream is advantageously made to impinge on the surface of the synthetic substrate at an angle of approximately 90° or, if possible, exactly 90°. For curved objects this requires the determination of an appropriately adapted median vapor-deposition direction, or a plurality of vapor sources must be provided.

The present invention is virtually applicable to any thermoplastic useful for its optical properties over a temperature range of from −20° to +80° C. Such thermoplastics include acrylates, e.g., polymethylmethacrylate; allyl resin, e.g., CR-39-1; polystyrene and polycarbonate.

When pure $SiO_2$ is vapor deposited on a Makrolon (polycarbonate) lens, temperature fluctuations of as little as 10° C. result in fine hairline cracks in the protective layer from the difference in coefficients of expansion (6 to $7\times10^{-5}$ per ° C. for Makrolon and $5\times10^{-7}$ per ° C. for $SiO_2$). Such hairline cracks are annoying in optical objects. By vapor depositing a two-component glass according to the subject invention, e.g., 30 percent by weight of $B_2O_3$, 70 percent by weight of $SiO_2$ and virtually no $Na_2O$, on the same Makrolon lens, a faultfree protective layer is obtained which is temperature resistant up to 80° C. This effect is achieved with a temperature coefficient ($5\times10^{-7}$ per ° C.) which more nearly corresponds to that of the synthetic substrate than does $SiO_2$.

Higher temperature resistance is achieved by increasing the $B_2O_3$ component. However, the proportion of boron oxide can not be arbitrarily increased without incurring possible detrimental effects. Faultfree protective layers for conventional synthetic substrates having different coefficients of expansion are prepared with a $B_2O_3$ component of less than 50 percent by weight. The layers are entirely resistant against temperatures of close to 100° C., i.e., even temperatures substantially higher than the normal application range of optical instruments. It is surprising that, in addition to the composition of the multicomponent glass, the grain size of the ground glass used for the vapor-deposition process, the $Na_2O$ component and the direction of impingement of the vapor are of substantial significance with respect to the quality of the protective layer produced.

The examples which follow are merely illustrative of the invention and are in no way limitative. Variations will be immediately apparent to the art skilled and are encompassed within the scope of the subject disclosure.

EXAMPLE 1

500 g. $B_2O_3$ of a grain size distribution between 20 and 30 z were thoroughly mixed with 500 g. $SiO_2$ of about the same grain size. The mixture was filled into a vacuum melting apparatus, in which the temperature was gradually raised from room temperature to 1,550° C. At the same time the vacuum was increased from $5\times10^{-4}$ torr to $8\times10^{-5}$ torr. After being completely melted, the temperature of the mixture was maintained at 1,550° C. for 10 minutes. The melt was then cooled down and the solidified glass, having the form of a longitudinal cylinder with a diameter of 70 mm., cut into discs of 12 mm. width ready for the evaporating process. As $B_2O_3$ is continuously set free during the melting process, its final proportion in the discs is only 40 percent.

EXAMPLE 2

In a vacuum coating apparatus spectacle lenses made of polycarbonate having a coefficient of expansion of $6.5 \times 10^{-5}$ per ° C. and a diameter of 50 mm. were mounted on a support at a vertical distance of 400 mm. from the evaporating means. The evaporating means consisted of a rotating support to which one glass disc obtained by the method of Example 1 was coaxially attached. Mounted above the glass disc was an electron beam gun which supplied the power for the evaporation of the glass. The electron beam was focused on the surface of the glass disc. At the beginning of the coating process a relative movement of the electron beam and the glass disc was performed in such a way that the surface of the glass was evaporated in a spiral curve at a speed of 30 mm. per minute. The evaporating means was started after the pressure in the coating apparatus was as low as $5 \times 10^{-5}$ torr. The coating process was stopped when the condensed layer of glass on the lenses had a thickness of about 3 $z$, which was achieved after five minutes. After some further five minutes the apparatus was flooded with air and the lenses taken out. They were highly scratch resistant. The glass layer had a high adhesion to the substrate and remained free of hairline cracks between a temperature of $-20$ and $+90°$ C. This is a stress normal spectacle lenses will never be submitted to in practical use.

EXAMPLE 3

Spectacle lenses made of polymethyl-methacrylate, having a coefficient of expansion of $7.6 \times 10^{-5}$ per ° C. and a diameter of 50 mm. were mounted in coating apparatus analogous to that of Example 2. A glow discharge of two minutes duration was applied to the lenses at a pressure of $8 \times 10^{-2}$ torr in order to improve the adherence of the glass layer to the substrate. The coating was then performed by evaporating a glass made by the method disclosed in Example 1. The coating parameters were the same as in Example 2. The coated lenses had excellent mechanical properties between $-20$ and $+75°$ C.

EXAMPLE 4

Spectacle lenses made of diallyglycolcarbonate (CR-39), having an average coefficient of expansion of $10.5 \times 10^{-5}$ per ° C. and a diameter of 50 mm. were mounted in a coating apparatus analogous to that of Example 2. Before the coating process was started, the lenses were submitted to a glow discharge process with a duration of two minutes at a pressure of $8 \times 10^{-2}$ torr. The coating was performed by evaporating a glass with a proportion of $B_2O_3$ of 50 percent being produced by a process similar to that of Example 1 but with 650 g. $B_2O_3$ as starting material instead of 500 g. The coated lenses had similar good mechanical properties between $-10$ and $+95°$ C.

What is claimed is:

1. A method of coating a transparent synthetic polymer substrate, comprising the steps of forming a molten glass consisting essentially of $B_2O_3$ and $SiO_2$ and containing less than five percent by weight of $Na_2O$, under vacuum for degassing, from constituents having a grain size of less than $50\mu$, and vapor depositing said glass onto said substrate.

2. A method according to claim 1 wherein the substrate is a member selected from the group consisting of polycarbonate, polymethylmethacrylate, diallylglycolcarbonate and polystyrene.

3. A method according to claim 1 wherein the $B_2O_3$ content of the glass is adjusted so that said glass coating resulting therefrom has a coefficient of expansion which is closer to that of the substrate than is the coefficient of expansion of $SiO_2$.

4. A method according to claim 3 wherein the vapor deposition is effected in a high vacuum of less than $5 \times 10^{-4}$ torr.

5. A method according to claim 3 wherein the direction of impingement of the vapor stream of the molten glass onto the surface of the thermoplastic substrate is approximately 90°.

6. A method according to claim 5 wherein said direction is 90°.

7. A method according to claim 1, said glass containing between 10 and 70 percent boron oxide.

8. A method according to claim 7, said glass containing between 30 and 50 percent boron oxide.

9. A method according to claim 1, said glass consisting of $B_2O_3$, and less than 5 percent by weight of $Na_2O$.

10. A method according to claim 1, said glass containing between 10 and 70 percent boron oxide, said vacuum for degassing being between $5 \times 10^{-4}$ torr to $8 \times 10^{-5}$ torr the $B_2O_3$ content of the glass being adjusted so that said glass coating has a coefficient of expansion which is closer to that of the substrate than is the coefficient of expansion of $SiO_2$, the vapor depositing being effected in a vacuum of less than $5 \times 10^{-4}$ torr.

11. A method according to claim 10, the vapor deposition being effected in a vacuum from $2 \times 10^{-4}$ to $10^{-5}$ torr.

12. A method according to claim 10, said glass containing 40 percent boron oxide and being prepared from a mixture of 50 percent of $B_2O_3$ of a grain size distribution between 20 and $30z$ and 50 percent $SiO_2$ of about the same grain size by melting at 1,550° C. under a vacuum for degassing increased from $5 \times 10^{-}$ $10^{-}$torr to $8 \times 10^{-5}$ torr, the molten mixture being held at 1,550° C. for 10 minutes and then cooled to glass; the substrate being polycarbonate having a coefficient of expansion of $6.5 \times 10^{-5}$ per ° C.; the vapor depositing being done using an electron beam at a pressure as low as $5 \times 10^{-5}$ torr to provide a coating thickness of $3\mu$; the coated substrate being allowed to remain under vacuum for some five minutes following the deposition of the coating.

* * * * *

UNITED STATES PATENT OFFICE
CERTIFICATE OF CORRECTION

Patent No. 3,645,779                    Dated February 29th, 1972

Inventor(s) Gerhard Kienel

It is certified that error appears in the above-identified patent and that said Letters Patent are hereby corrected as shown below:

In the heading of the patent, line 6, change "Heraeurs" to --Heraeus--. Column 1, line 64, change "$\zeta$" to --$\mu$--; line 72, change "53 x 10$^-$" to --53 x 10$^{-7}$--. Column 2, line 39, change "5 x 10$^-$" to --5 x 10$^{-6}$--; line 63, change "$\zeta$" to --$\mu$--. Column 3, line 19, change "$\zeta$" to --$\mu$--. Column 4, line 28, after "$B_2O_3$," insert --$SiO_2$,--; line 41, change "$\zeta$" to --$\mu$--; line 43, change "5 x 10$^{-10}$" to --5 x 10$^{-4}$--.

Signed and sealed this 5th day of September 1972.

(SEAL)
Attest:

EDWARD M. FLETCHER, JR.
Attesting Officer

ROBERT GOTTSCHALK
Commissioner of Patents